(12) United States Patent
Farago et al.

(10) Patent No.: US 12,199,530 B2
(45) Date of Patent: Jan. 14, 2025

(54) CONTROL CIRCUITS FOR DISPOSER MOTORS

(71) Applicant: InSinkErator LLC, Benton Harbor, MI (US)

(72) Inventors: Charles Farago, Kenosha, WI (US); Heath McClung, Wildwood, MO (US); Charles Green, Fenton, MO (US); Joshua Edward Tischler, St. Louis, MO (US)

(73) Assignee: Insinkerator LLC, Benton Harbor, MI (US)

( * ) Notice: Subject to any disclaimer, the term of this patent is extended or adjusted under 35 U.S.C. 154(b) by 350 days.

(21) Appl. No.: 17/568,314

(22) Filed: Jan. 4, 2022

(65) Prior Publication Data

US 2022/0345055 A1 Oct. 27, 2022

Related U.S. Application Data

(60) Provisional application No. 63/177,630, filed on Apr. 21, 2021, provisional application No. 63/177,634, filed on Apr. 21, 2021.

(51) Int. Cl.
*H02P 1/42* (2006.01)
*E03C 1/266* (2006.01)

(52) U.S. Cl.
CPC .............. *H02P 1/42* (2013.01); *E03C 1/2665* (2013.01)

(58) Field of Classification Search
CPC .................................. H02P 1/42; E03C 1/2665
(Continued)

(56) References Cited

U.S. PATENT DOCUMENTS 2,762,004 A 9/1956 Shepardson
3,504,863 A 4/1970 Burkland et al.
(Continued)

FOREIGN PATENT DOCUMENTS

BR 202017002984 U2 * 10/2017
CN 1477998 A * 2/2004 ............. B02C 18/24
(Continued)

OTHER PUBLICATIONS

InspectAPedia: Electric Motor Start/Run Capacitator Operation, http://inspectapedia.com/electric/Start_Capacitor_Operation.php; 2021; 14 pages.
(Continued)

*Primary Examiner* — Kawing Chan
(74) *Attorney, Agent, or Firm* — Harness, Dickey & Pierce, P.L.C.

(57) ABSTRACT

A disposal assembly includes a motor coupled to operate a grinding mechanism of a food waste disposer. A first switch is coupled to selectively inhibit the supply of power from a power source to a main winding of the motor, and a second switch is coupled to selectively inhibit the supply of power from the power source to a start winding of the motor. A control circuit is configured to close the first and second switches during an initial startup time period, detect a voltage of at least one of the windings, and open the second switch in response to detection of the voltage above a start voltage threshold value. The control circuit is also configured to subsequent to opening the second switch, close the second switch in response to detection of the voltage below a low voltage threshold value indicative of an excess load condition of the motor.

14 Claims, 12 Drawing Sheets

(58) Field of Classification Search
USPC .......................................................... 318/790
See application file for complete search history.

(56) References Cited

U.S. PATENT DOCUMENTS

| | | | |
|---|---|---|---|
| 3,529,223 A | 9/1970 | Vergez, Jr. | |
| 3,545,684 A | 12/1970 | Hilmanowski | |
| 4,387,329 A | 6/1983 | Harlow | |
| 4,492,911 A | 1/1985 | Molitor | |
| 4,659,975 A | 4/1987 | Vincent | |
| 4,780,658 A | 10/1988 | Koyama | |
| 5,187,419 A | 2/1993 | DeLange | |
| 5,247,237 A | 9/1993 | Koyama et al. | |
| 5,276,392 A | 1/1994 | Beckerman | |
| 6,194,864 B1 | 2/2001 | Kinpara et al. | |
| 6,407,530 B1 | 6/2002 | Kwon et al. | |
| 6,594,592 B1 | 7/2003 | Griepentrog et al. | |
| 6,756,756 B1* | 6/2004 | Chmiel | H02P 1/42 318/785 |
| 7,365,959 B1 | 4/2008 | Ward | |
| 7,448,563 B2* | 11/2008 | Berger | B02C 18/16 241/36 |
| 7,538,507 B2 | 5/2009 | Lu et al. | |
| 7,583,127 B2 | 9/2009 | Sibrai et al. | |
| 7,679,307 B2 | 3/2010 | Mills, Jr. et al. | |
| 7,768,227 B2 | 8/2010 | Vaez-Zadeh et al. | |
| 7,971,810 B2 | 7/2011 | Hirsch et al. | |
| 8,120,305 B2 | 2/2012 | Kim | |
| 8,270,143 B2 | 9/2012 | Stockman | |
| 8,371,824 B2 | 2/2013 | Jeong et al. | |
| 8,456,795 B2 | 6/2013 | Stockman | |
| 8,618,761 B2 | 12/2013 | Hudson et al. | |
| 8,764,409 B2 | 7/2014 | Han et al. | |
| 9,222,246 B2 | 12/2015 | VanAssche et al. | |
| 9,397,596 B2* | 7/2016 | Baker | B01F 35/3204 |
| 9,422,698 B2 | 8/2016 | Gormley et al. | |
| 9,506,231 B2 | 11/2016 | Gormley et al. | |
| 9,806,660 B1 | 10/2017 | Chretien et al. | |
| 9,815,064 B2 | 11/2017 | Hirsch et al. | |
| 9,869,077 B2 | 1/2018 | Gormley et al. | |
| 10,471,438 B2 | 11/2019 | Chavez | |
| 10,804,830 B1 | 10/2020 | Zhang et al. | |
| 2007/0057647 A1 | 3/2007 | Burkhart et al. | |
| 2009/0213523 A1 | 8/2009 | Slaughter | |
| 2015/0115076 A1 | 4/2015 | Gormley et al. | |
| 2016/0197566 A1 | 7/2016 | Alvey et al. | |
| 2017/0085204 A1 | 3/2017 | Didat | |
| 2018/0241332 A1* | 8/2018 | Ottewill | H02P 23/14 |
| 2020/0171507 A1* | 6/2020 | Berger | B02C 18/0092 |

FOREIGN PATENT DOCUMENTS

| | | | |
|---|---|---|---|
| EP | 1742348 B1 | 3/2011 | |
| GB | 716089 A | 9/1954 | |
| GB | 745978 A | 3/1956 | |
| IN | 258054 | 11/2013 | |
| JP | H08251985 A | * | 9/1996 |
| JP | H1133290 A | * | 2/1999 |

OTHER PUBLICATIONS

Induction Motors, Trade of Electrician, Standards Based Apprenticeship Course Notes, Phase 2, Module No. 2.4, Unit No. 2.4.1., Revision Nov. 4, 2013, 48 pages.

What is Speed Control Induction Motor? By Linquip Team, circuitglobe.com, Jan. 26, 2021, 7 pages.

Determining Electric Motor Load and Efficiency, Motor Challenge Fact Sheet, U.S. Department of Energy, accessed Apr. 8, 2022, www.motor.doe.gov, 6 pages.

* cited by examiner

CONTROL CIRCUITS FOR DISPOSER MOTORS

CROSS-REFERENCE TO RELATED APPLICATIONS

This application claims the benefit and priority of U.S. Provisional Application No. 63/177,630, filed on Apr. 21, 2021, and U.S. Provisional Application No. 63/177,634, filed on Apr. 21, 2021. The entire disclosures of each of the above applications are incorporated herein by reference.

FIELD

The present disclosure relates to control circuits for disposer motors.

BACKGROUND

This section provides background information related to the present disclosure which is not necessarily prior art.

Food waste disposers include a motor that drives a grinding mechanism to break down food waste. Common types of disposers include a continuous feed type, and a switch activated type. The switch activated disposer motor utilizes three or four flag terminals that connect to a mechanical centrifugal switch, which controls main and auxiliary windings based on a revolutions per minute (RPM) of a rotating shaft of the motor. The common flag terminal connects to a thermal overload protector switch, which cuts power to the motor if a motor temperature exceeds an overload rating.

SUMMARY

This section provides a general summary of the disclosure, and is not a comprehensive disclosure of its full scope or all of its features.

According to one aspect of the present disclosure, a disposal assembly includes a motor coupled to operate a grinding mechanism of a food waste disposer. The motor includes a stator core having a stator yoke and a plurality of teeth extending from the stator yoke toward a central opening, with the central opening extending from a first end of the stator core to a second end of the stator core opposite the first end, and the plurality of teeth spaced apart from one another and defining a plurality of slots between the plurality of teeth. The motor further includes a main winding and a start winding located within the plurality of slots and wrapped around the plurality of teeth, with the main winding coupled with a line terminal to receive power from a power source, and the start winding coupled with the line terminal to receive power from the power source. The assembly includes a first switch coupled between the line terminal and the main winding to selectively inhibit the supply of power from the power source to the main winding, a second switch coupled between the line terminal and the start winding to selectively inhibit the supply of power from the power source to the start winding, a capacitor coupled between the line terminal and the second switch, and a control circuit coupled to control switching operation of the first switch and the second switch. The control circuit is configured to close the first switch and the second switch during an initial startup time period of the motor, detect a voltage of at least one of the main winding and the start winding, and open the second switch in response to detection of the voltage above a start voltage threshold value indicative of a successful startup of the motor. The control circuit is also configured to, subsequent to opening the second switch in response to detection of the voltage above the start voltage threshold value, close the second switch in response to detection of the voltage below a low voltage threshold value indicative of an excess load condition of the motor.

According to another aspect of the present disclosure, a disposal assembly includes a motor coupled to operate a grinding mechanism of a food waste disposer. The motor includes a stator core having a stator yoke and a plurality of teeth extending from the stator yoke toward a central opening, with the central opening extending from a first end of the stator core to a second end of the stator core opposite the first end, and the plurality of teeth spaced apart from one another and defining a plurality of slots between the plurality of teeth. The motor further includes a main winding and a start winding located within the plurality of slots and wrapped around the plurality of teeth, with the main winding coupled with a line terminal to receive power from a power source, and the start winding coupled with the line terminal to receive power from the power source. The assembly includes a first switch coupled between the line terminal and the main winding to selectively inhibit the supply of power from the power source to the main winding, a second switch coupled between the line terminal and the start winding to selectively inhibit the supply of power from the power source to the start winding, and a control circuit coupled to control switching operation of the first switch and the second switch. The control circuit is configured to close the first switch and the second switch during a specified initial startup time period of the motor, open the second switch at the end of the specified initial startup time period, detect a voltage of at least one of the main winding and the start winding, and close the second switch in response to detection of the voltage below a low voltage threshold value indicative of an excess load condition of the motor.

According to another aspect of the present disclosure, a method of controlling a disposal assembly is disclosed. The assembly includes a motor coupled to operate a grinding mechanism of a food waste disposer. The motor includes a stator core having a stator yoke and a plurality of teeth extending from the stator yoke toward a central opening, with the central opening extending from a first end of the stator core to a second end of the stator core opposite the first end, and the plurality of teeth spaced apart from one another and defining a plurality of slots between the plurality of teeth. The motor further includes a main winding and a start winding located within the plurality of slots and wrapped around the plurality of teeth, a first switch coupled between the line terminal and the main winding, and a second switch coupled between the line terminal and the start winding. The method includes closing the first switch and opening the second switch to supply power from the power source to the main winding, detecting a voltage of at least one of the main winding and the start winding, and closing the second switch in response to detection of the voltage below a low voltage threshold value indicative of an excess load condition of the motor, to supply power from the power source to the main winding and the start winding. Subsequent to closing the second switch, the method includes periodically detecting the voltage of the at least one of the main winding and the start winding, and in response to the detected voltage remaining below the low voltage threshold value for a specified number of periods, opening the first switch and the second switch to inhibit the supply of power from the power source to the main winding and the start winding.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
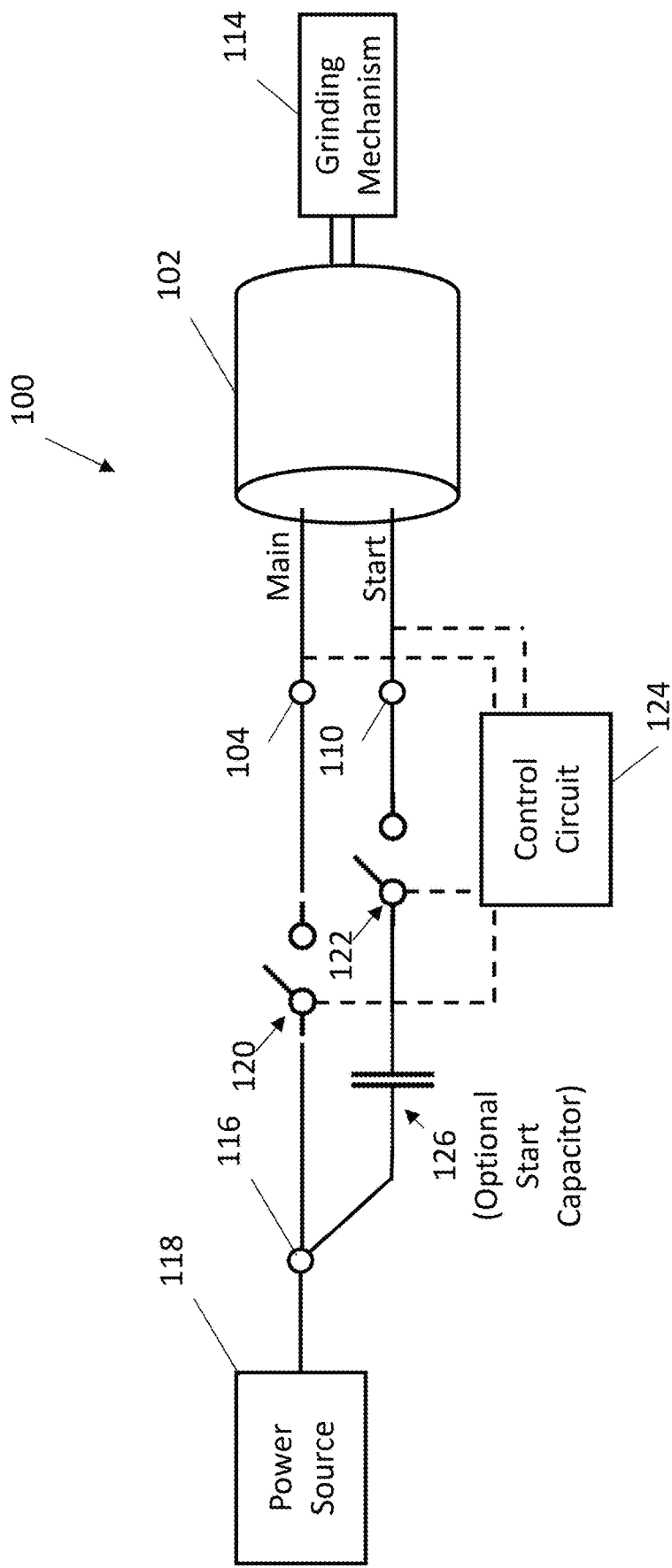
FIG. 1 is a block diagram of a disposal assembly, according to one example embodiment of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
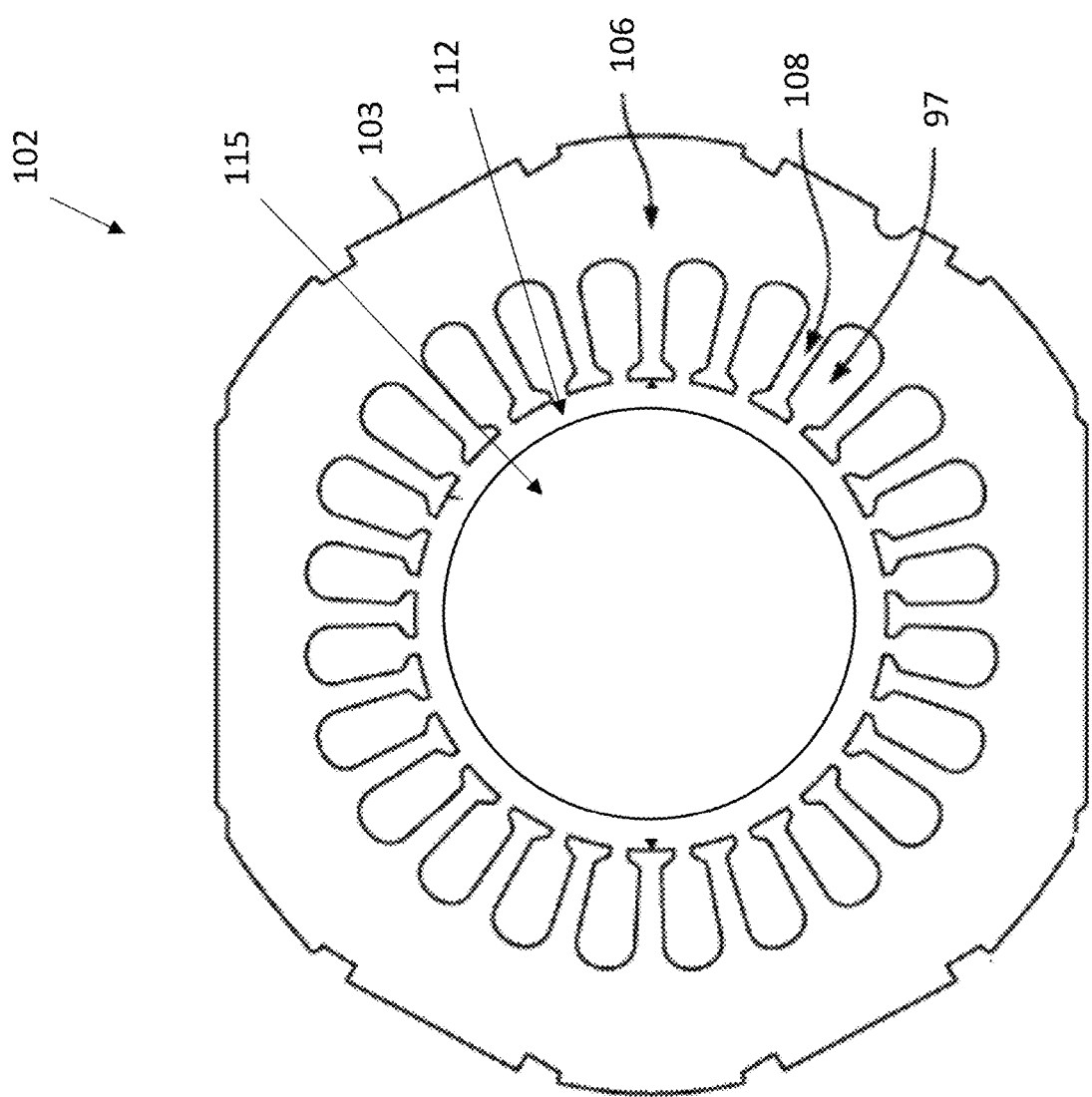
FIG. 2 is a top view of the motor of FIG. 1.
Figure 3:
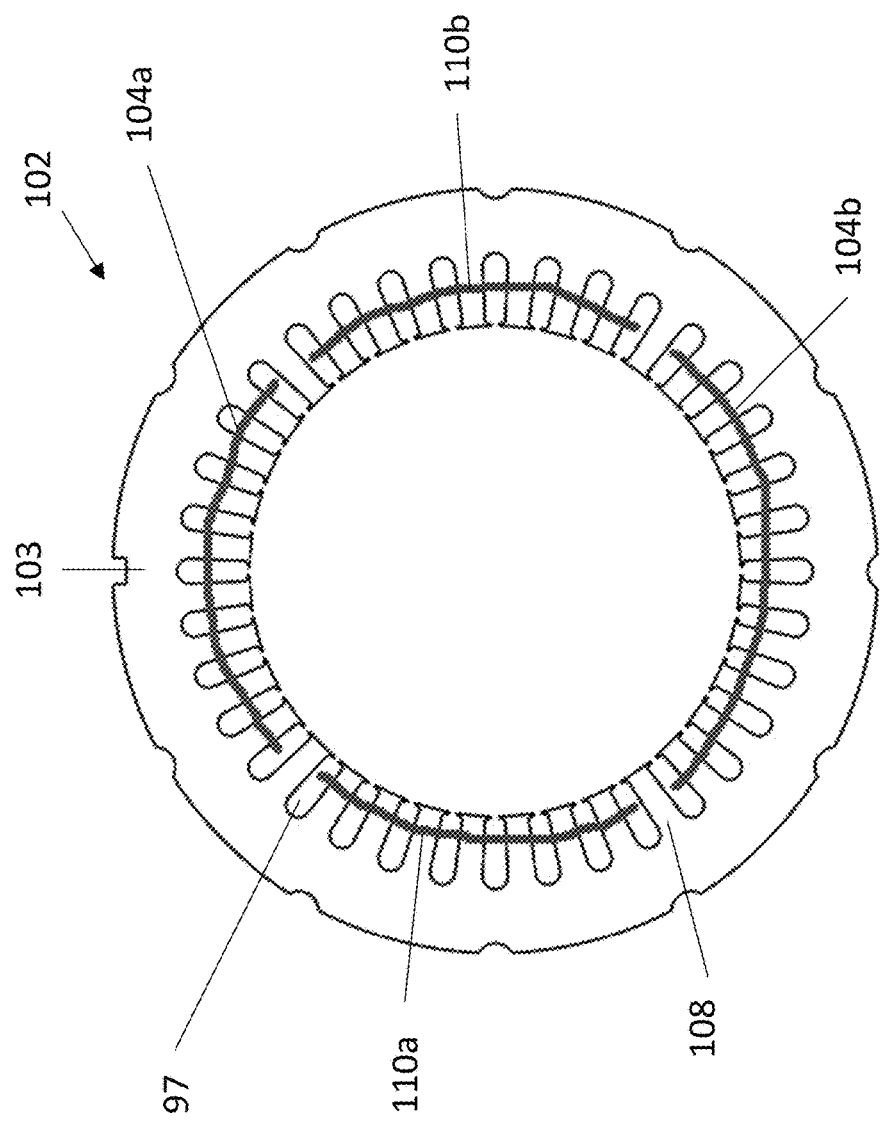
FIG. 3 is a top view of the motor of FIG. 1 illustrating an example winding pattern of the motor.

A disposal assembly according to one example embodiment of the present disclosure is illustrated in FIGS. 1-3, and indicated generally by the reference number 100. The disposal assembly 100 includes a motor 102 coupled to operate a grinding mechanism 114 of a food waste disposer.

The motor 102 includes a stator core 103 having a stator yoke 106 and a plurality of teeth 108 extending from the stator yoke 106 toward a central opening 112. The central opening 112 extends from a first end of the stator core 103 to a second end of the stator core 103 opposite the first end. The plurality of teeth 108 are spaced apart from one another and define a plurality of slots 97 between the plurality of teeth 108.

The motor 102 further includes a main winding 104 and a start winding 110 located within the plurality of slots 97 and wrapped around the plurality of teeth 108. The main winding 104 is coupled with a line terminal 116 to receive power from a power source 118 (such as a power supply circuit that converts power from a utility power source). In other embodiments, the motor 102 may include more than one main winding 104, more than one start winding 110, etc.

As shown in FIG. 1, the assembly 100 includes a switch 120 coupled between the line terminal 116 and the main winding 104 to selectively inhibit the supply of power from the power source 118 to the main winding 104. Another switch 122 is coupled between the line terminal 116 and the start winding 110 to selectively inhibit the supply of power from the power source 118 to the start winding 110.

In some embodiments, the assembly 100 may include only the single switch 122 for selectively coupling the start winding 110 with the power source 118 (e.g., while the main winding 104 is always coupled with the power source 118). In various implementations, the switch 120 may be coupled to the output of the power source 118, such as electrically coupled between the power source 118 and the line terminal 116. Each switch 120 and 122 may include any suitable switching device, such as an electronic relay.

A control circuit 124 is coupled to control switching operation of the switch 120 and the switch 122. The control circuit 124 is configured to close the switch 120 and the switch 122 during a specified initial startup time period of the motor 102, to supply power from the power source 118 to the main winding 104 and the start winding 110 to start the motor 102.

The control circuit 124 may be configured to open the switch 122 at the end of the specified initial startup time period. For example, the specified initial startup time period may be selected based on a normal amount of time it takes the motor to reach a full startup speed (e.g., a normal runtime operation speed such as greater than or equal to 1500 revolutions per minute (RPM)), etc. The specified initial startup time period may be any suitable value, such as at least 100 ms, at least 200 ms, at least 300 ms, at least ten electrical cycles, etc.

In some embodiments, the control circuit 124 may be configured to, after an initial startup from zero RPM, etc., detect a voltage of at least one of the main winding 104 and the start winding 110, to determine whether the motor 102 has reached a full startup speed. For example, the control circuit 124 may briefly open the switch 122 to measure a voltage at the start winding 110, and then close the switch 122 again to continue supplying power to the start winding 110. The brief opening of the switch 122 may be for any duration needed to take a voltage measurement of the start winding 110, such as approximately one electrical cycle, approximately 1/16 of a second, etc.

The detected voltage may be used to determine a speed of the motor 102 (e.g., via a lookup table, via an equation calculation, etc.), may be used to indicate whether the motor 102 has reached a full startup speed, etc. For example, the detected voltage may be compared to a start voltage threshold to determine whether the motor 102 has reached a full startup speed. The control circuit 124 may open the switch 122 in response to detection of the voltage above a start voltage threshold value indicative of a successful startup of the motor 102.

In various implementations, the voltage on the start winding 110 (sometimes referred to as an auxiliary winding), when either open or using a capacitor (such as the optional capacitor 126), will change as a load of the motor 102 changes. Therefore, voltage measurements on the main winding 104 and the start winding 110 may be used to estimate rotational speed and load of the motor 102. This may also allow for the prediction of other motor parameters such as power and approximate current levels (e.g. for protection of the motor 102). The detected voltages may be measured/determined as root mean square (RMS) voltages.

A polynomial equation may incorporate phase information, such as the phase difference between the main and start winding voltages, to provide an enhanced estimate of the motor parameters. Capacitor variations and differences may be incorporated in the polynomial calculation, and may provide a prediction of capacitor degradation as a diagnostic.

The assembly 100 may include an optional start capacitor 126 coupled between the line terminal 116 and the switch 122, to supply power from the power source 118 to the start winding 110. When the capacitor 126 is present, the control circuit 124 may measure a voltage of the start winding 110 without opening the switch 122. This detected voltage may be used to determine a speed of the motor 102 (e.g., the detected voltage may be compared to a start voltage threshold value to determine whether to open the switch 122 in response to successful startup of the motor 102). In various implementations, the speed of the motor 102 may be determined based on only the voltage of the start winding 110 (e.g., if the line voltage is fixed or known and the capacitance value of the capacitor 126 is known). If the capacitance value of the capacitor 126 is already known, the rotational speed of the motor 102 may optionally be determined based on voltages of the main winding 104 and the start winding 110. Alternatively, or additionally, a voltage of the capacitor 126 (such as an RMS capacitor voltage) may be used in the polynomial equation to provide the estimate of motor parameters. For example, the control circuit 124 may receive the RMS voltage of the capacitor 126 (instead of or in addition to determining the phase difference between the main and auxiliary winding voltages), and predict a rotational speed of the motor 102 based on the capacitor RMS voltage, the voltage of the main winding 104, and the voltage of the auxiliary winding 110.

In some embodiments, the speed of the motor 102 may be detected using a current sensor, a speed sensor, etc. This approach may be more expensive than using voltage detection, but a sensed current or speed could be compared to a start current or start speed threshold value to determine whether the motor 102 has successfully started up (e.g., whether the switch 122 can be opened to disconnect the start winding 110).

After startup of the motor 102, the control circuit 124 may be configured to detect a voltage of at least one of the main winding 104 and the start winding 110, and close the switch 122 in response to detection of the voltage below a low voltage threshold value indicative of an excess load condition of the motor. For example, during normal runtime operation of the motor 102, the control circuit 124 may periodically check the voltage to determine whether the motor 102 is experiencing an excess load condition. If the detected voltage drops below a low voltage threshold value (e.g., indicating a low speed of the motor such as less than 500 RPM, indicating an excess current in the motor, etc.), the control circuit 124 may close the switch 122 to supply power to the start winding 110 to provide more power for the motor 102 to handle the excess load condition. In various implementations, the control circuit 124 may determine a rotational speed of the motor 102 directly based on the voltage(s) of the main winding 104 and/or start winding 110, and use the determined rotational speed based on the voltage(s) to decide when to close the switch 122 (e.g., such as when the determined speed based on the voltage(s) drops below the specified threshold value).

Once the excess load condition ends, the control circuit 124 may open the switch 122 to disconnect the start winding 110, so the motor 102 is driven only by power to the main winding 104 during normal runtime operation. For example, if the detected voltage exceeds the low voltage threshold value, the control circuit 124 may open the switch 122. As mentioned above, a current sensor, speed sensor, etc. may be used to determine a speed of the motor 102. The control circuit 124 may be configured to close the switch 122 if the determined speed drops below a threshold value indicative of an excess load condition, and to open the switch 122 if the determined speed increases above the threshold value to indicate that the excess load condition has ended.

In some embodiments, the control circuit 124 may be configured to shut down the motor 102 if the excess load condition is not resolved within a specified time period, within a specified number of voltage detection cycles, etc. For example, if the control circuit 124 closes the switch 122 in response to detection of a voltage below the low voltage threshold value, the control circuit 124 may subsequently periodically detect the voltage of the at least one of the main winding 104 and the start winding 110. In response to the detected voltage remaining below the low voltage threshold value for a specified number of periods, the control circuit may open the switch 120 and the switch 122 to inhibit the supply of power from the power source 118 to the main winding 104 and the start winding 110.

In some embodiments, the control circuit 124 may be configured to detect a current through at least one of the main winding 104 and the start winding 110, and open the switch 120 and the switch 122 in response to a detection of the current above an overcurrent threshold value indicative of an excess current condition of the motor 102.

The control circuit 124 and the switches 120 and 122 may define an electronic switch implementation (for example, where the control circuit 124 is a microprocessor and the switches 120 and 122 are electronic relays), which provides both startup winding control and excess current protection.

For example, a microprocessor may determine when the motor has successfully started (e.g., based on measured voltage(s) of the main winding 104 and/or the start winding 110). The microprocessor may then open the switch 122 to disconnect the start winding 110 from the power source 118, while leaving the main winding 104 connected to the power source 118 for normal running operation.

The control circuit 124 may provide protection to the motor 102 by disconnecting the power source 118 from the main winding 104 and the start winding 110 (e.g., by opening both switches 120 and 122), when an excess current is detected in the main winding 104 and/or the start winding 110 (which may indicate that a temperature of the motor 102 is exceeding a temperature rating of the motor).

The assembly 100 may provide increased usable space within the disposer, as compared to disposer assemblies that use a mechanical centrifugal switch and a separate current protection circuit. For example, a mechanical switch may require more space than electronic switch implementations described herein, and may add cost and complexity compared to electronic switch implementations.

Using a separate mechanical switch and overcurrent protection circuit may also increase size, cost and manufacturing requirements, as compared to electronic switch implementations. In some embodiments, example disposal assemblies described herein may use a single electronic switch implementations for both startup control of the motor 102 and overcurrent protection of the motor 102, without any mechanical centrifugal switch or separate overcurrent protection circuits.

As mentioned above, the assembly 100 may include an integrated dual purpose electronic switch that reduces a physical footprint on a circuit board (e.g., as compared to disposers that use mechanical switches and separate overcurrent protection circuits), as well as reduce manufacturing complexity by using a single switching component. The electronic switch may increase motor control options, and provide the ability to add additional features to the assembly, such as wireless control, light emitting diode (LED) lighting, and other smart features that may be controlled by the microprocessor.

Figure 4:
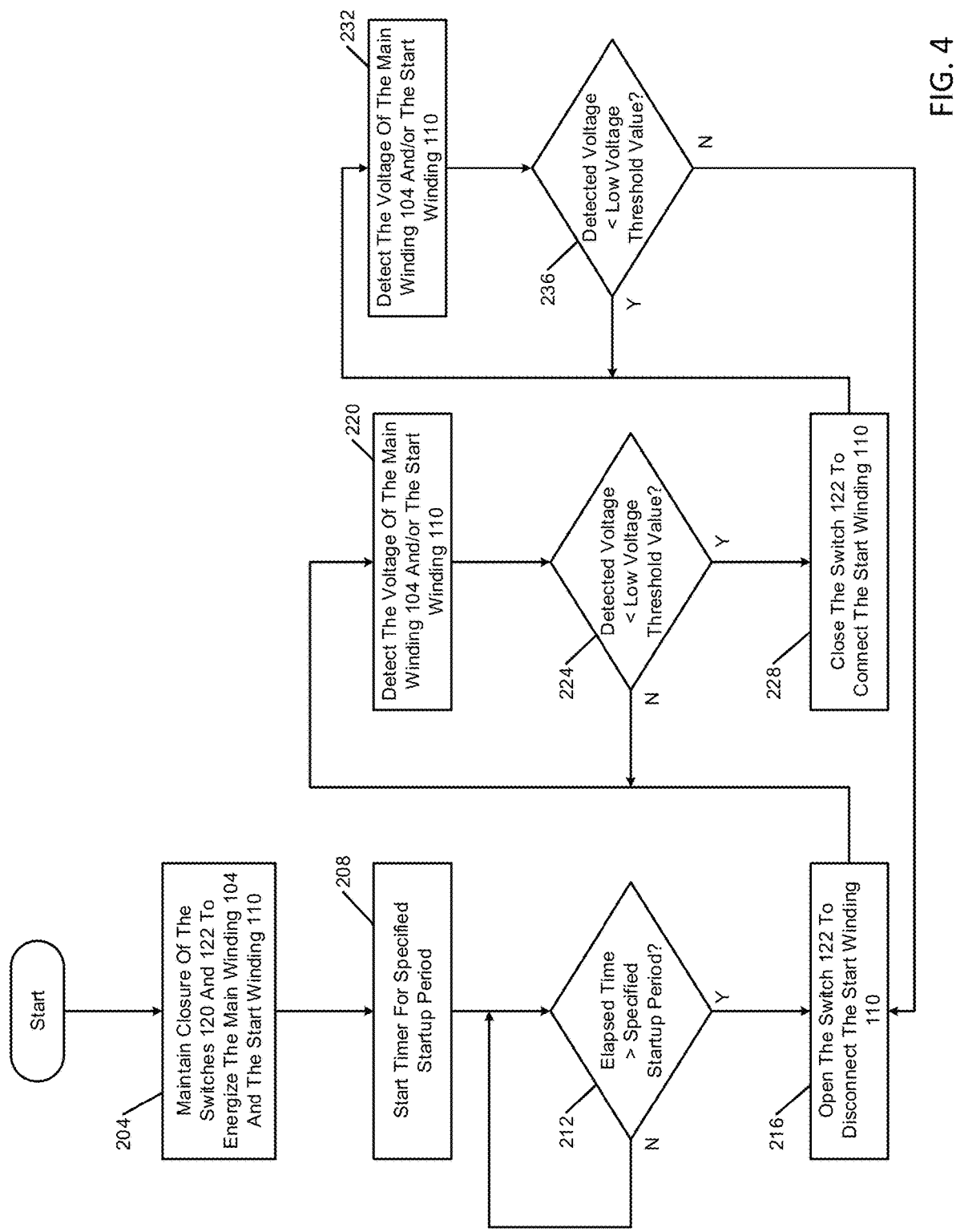
FIG. 4 is a flowchart depicting an example switching control process performed by the control circuit of FIG. 1, according to another example embodiment of the present disclosure.

FIG. 4 illustrates an example control process, which may be performed by the control circuit 124 to operate the switches 120 and/or 122. The process starts at 204, in response to startup of the motor 102. At 204, the control circuit 124 maintains the switches 120 and 122 in a closed state, to supply power to the start winding 110 from the power source 118.

At 208, the control circuit 124 starts a timer for a specified startup period (e.g., an amount of time the motor 102 normally takes to complete the startup process and reach a normal runtime speed). At 212, control determines whether an elapsed time since the initial (e.g., zero RPM) startup of the motor 102 has reached the specified startup period. If not, control returns 212 to continue waiting.

Once the elapsed time is greater than or equal to the specified time period at 212, the control circuit 124 proceeds to 216 to open the switch 122 and disconnect the start winding 110. At that point, the power source 118 supplies power to only the main winding 104 for normal run operation.

At 220, the control circuit 124 detects a voltage of at least one of the main winding 104 and the start winding 110. For example, the control circuit 124 may detect a voltage across each winding, a back electromagnetic force (EMF) of each winding, etc. In some embodiments, the control circuit 124 may measure a voltage across the un-energized start winding 110, which produces a voltage on its own due to the rotating magnetic field produced by the rotor. In this manner, the un-energized start winding 110 may be behaving like a generator/transformer due to the rotating motor 102, and the control circuit 124 measures the voltage of the winding 110 to determine how fast the generator is rotating (e.g., from the perspective of the start winding).

The amplitude of the voltage generated on the start winding 110 may correspond to a rotation speed of the motor 102. For example, a lookup table, equation calculation, etc. may be used to determine a rotation speed based on the detected voltage of the start winding 110. In some embodiments, there may be a linear relationship between the voltage of the start winding and the rotation speed of the motor 102.

At 224, the control circuit 124 determines whether the detected voltage is less than a low voltage threshold value (e.g., indicative of an excess load condition of the motor 102). If not, control returns to 220 to again check the voltage of the main winding 104 and/or the start winding 110. The control circuit 124 may implement a delay period between each measurement of the voltage(s), to reduce the frequency of voltage measurements.

If the detected voltage is less than the low voltage threshold value at 224, the control circuit 124 may close the switch 122 to connect the start winding 110 at 228. This may supply more power to the motor 102 via the start winding 110 in order to handle the excess load condition. The detected voltage(s) may be considered as one or more excess load criteria for determining whether the motor 102 is experiencing an excess load condition, where other suitable criteria may include a speed of the motor, a current of the motor, an elapsed time since power was initially supplied to the motor, etc. In some embodiments, the detected voltage(s) may be used in a multidimensional polynomial equation to determine a speed or one or more thresholds for controlling the switch 122. For example, if the assembly 100 includes the optional start capacitor 126, a voltage of the capacitor may be one of the dimensions of the equation.

At 232, the control circuit 124 detects the voltage of the main winding 104 and/or the start winding 110. If the detected voltage is below the threshold voltage, the control circuit 124 continues to periodically detect the voltage until the excess load condition ends. Once the detected voltage is greater than the low voltage threshold value at 236, the control circuit 124 opens the switch 122 to disconnect the start winding 110 at 216 (e.g., because the excess load condition has ended and the motor may resume normal runtime operation using only the main winding 104).

Figure 5:
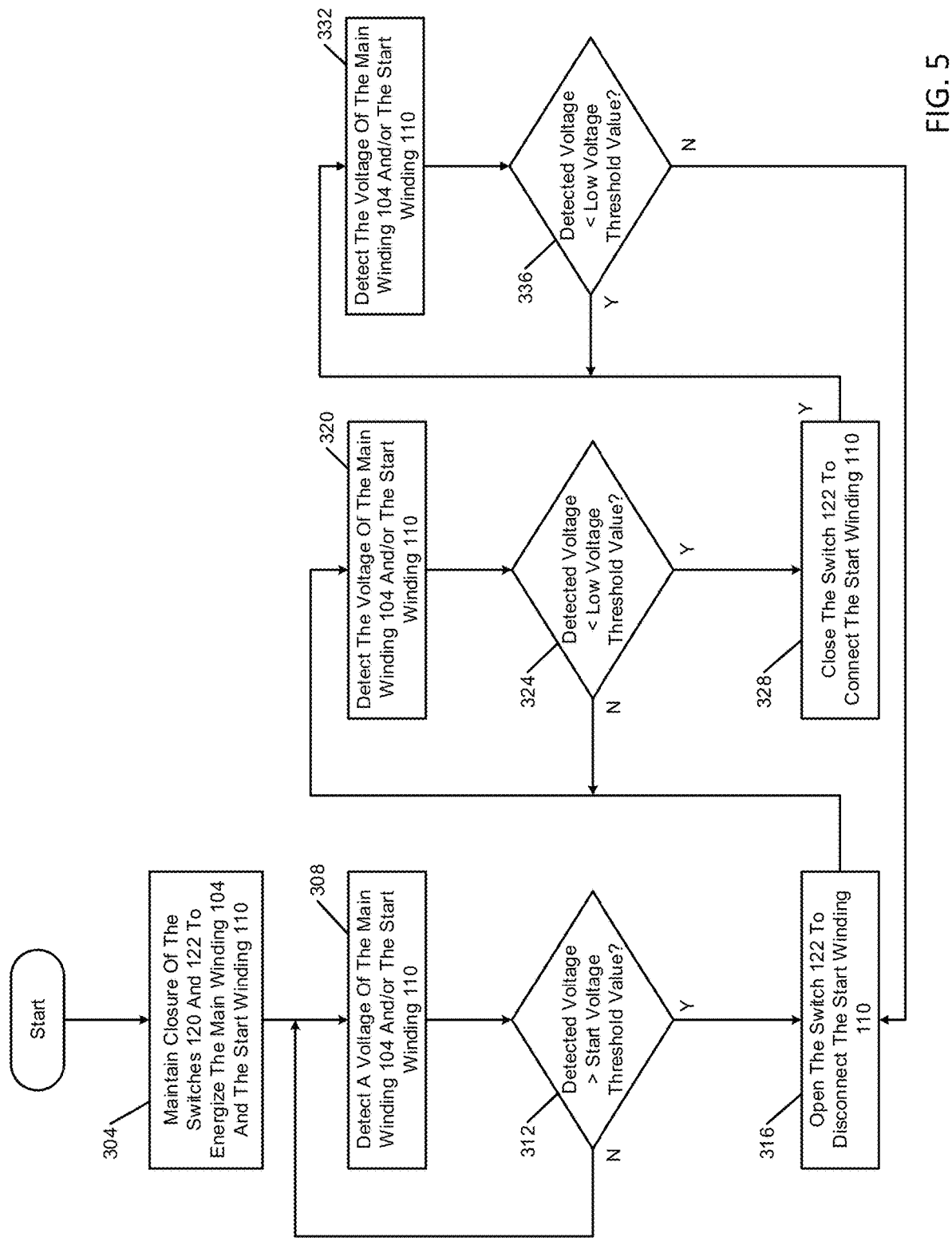
FIG. 5 is a flowchart depicting another example switching control process performed by the control circuit of FIG. 1 based on detection of a voltage of the main and/or start windings during motor startup, according to another example embodiment of the present disclosure.

FIG. 5 illustrates another example control process, which may be performed by the control circuit 124 to operate the switches 120 and/or 122. The process starts at 304, in response to startup of the motor 102. At 304, the control circuit 124 maintains the switches 122 and 124 in a closed state to supply power to the main winding 104 and the start winding 110 from the power source 118.

At 308, the control circuit 124 detects a voltage of at least one of the main winding 104 and the start winding 110. The control circuit 124 determines whether the detected voltage is greater than a start voltage threshold value, at 312. If not, the control circuit 124 returns to 308 to again detect the voltage of the main winding 104 and/or the start winding 110, to wait for the motor 102 to complete the startup process.

In some embodiments, the detected voltage(s) may be considered as one or more startup criteria for determining whether the motor 102 has completed the startup process, where other suitable criteria may include a speed of the motor, a current of the motor, an elapsed time since power was initially supplied to the motor, etc.

In some embodiments, the control circuit 124 may determine a speed of the motor 102 based on the detected voltage. For example, the control circuit 124 may use one or more equations to calculate a rotation speed of the motor 102 according to the detected voltage, may use a lookup table that maps rotation speeds to detected winding voltages, etc. The startup voltage threshold value may correspond to a normal runtime speed of the motor 102 (e.g., at least 1500 RPM, etc.), and the low voltage threshold value may correspond to a speed of the motor 102 during an excess load condition (e.g., less than 500 RPM, etc.).

Once the elapsed time is greater than the start voltage threshold value at 212, the control circuit 124 proceeds to 316 to open the switch 122 and disconnect the start winding 110. At that point, the power source 118 supplies power to only the main winding 104 for normal run operation.

At 320, the control circuit 124 detects a voltage of at least one of the main winding 104 and the start winding 110. At 324, the control circuit 124 determines whether the detected voltage is less than a low voltage threshold value (e.g., indicative of an excess load condition of the motor 102). If not, control returns to 320 to again check the voltage of the main winding 104 and/or the start winding 110.

If the detected voltage is less than the low voltage threshold value at 324, the control circuit 124 may close the switch 122 to connect the start winding 110 at 328. At 332, the control circuit 124 detects the voltage of the main winding 104 and/or the start winding 110. If the detected voltage is below the threshold voltage, the control circuit 124 continues to periodically detect the voltage until the excess load condition ends. Once the detected voltage is greater than the low voltage threshold value at 336, the control circuit 124 opens the switch 122 to disconnect the start winding 110 at 216 (e.g., because the excess load condition has ended and the motor may resume normal runtime operation using only the main winding 104).

Figure 6:
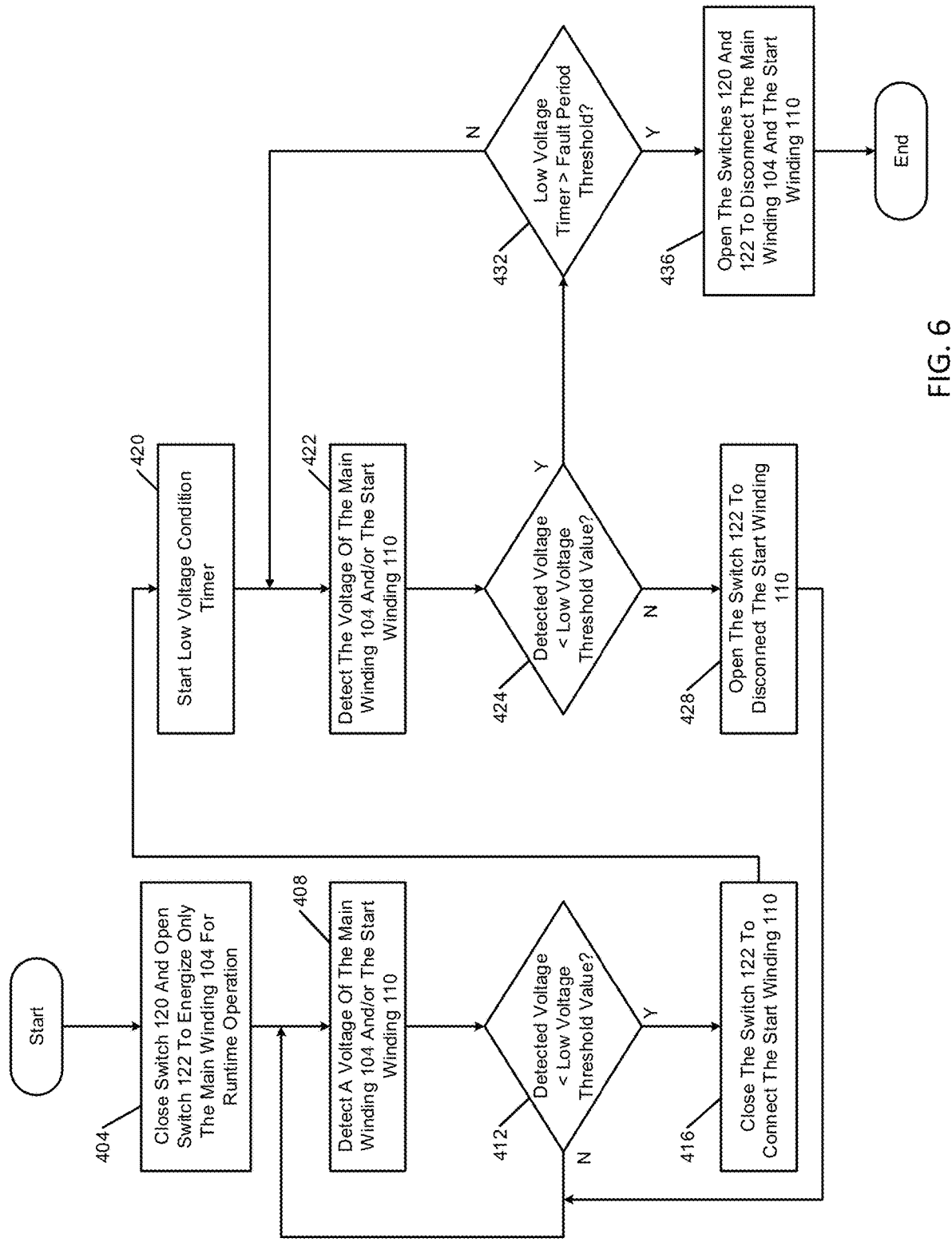
FIG. 6 is a flowchart depicting another example switching control process performed by the control circuit of FIG. 1 for fault detection, according to another example embodiment of the present disclosure.

FIG. 6 illustrates an example process for detecting a fault condition of the motor 102. At 404, the control circuit 124 closes the switch 120 and opens the switch 122 to energize only the main winding 104 for runtime operation. At 408, the control circuit detects a voltage of the main winding 104 and/or the start winding 110.

The control circuit determines whether the detected voltage is less than a low voltage threshold at 412. If so, the control circuit 124 closes the switch 122 to connect the start winding 110 (e.g., to provide extra power for the motor 102 to handle an excess load condition).

At 420, the control circuit 124 starts a low voltage condition timer. For example, if the control circuit 124 detects an excess load condition for more than a specified period of time (e.g., for a specified number of voltage measurement cycles, etc.), it may indicate that a fault or excess current condition has occurred and the motor should be shut down to prevent damage.

At 422, the control circuit 124 detects the voltage of the main winding 104 and/or the start winding 110. If the detected voltage is greater than the low voltage threshold value at 424, the control circuit opens the switch 122 at 428 to disconnect the start winding 110 (e.g., because the excess load condition has ended).

If the detected voltage remains less than the low voltage threshold 424, control determines whether the low voltage timer is greater than a fault period threshold at 432. For example, if the amount of time elapsed since the excess load condition first occurred is greater than the fault period threshold, the control circuit 124 may open the switches 120 and 122 at 436, to disconnect the main winding 104 and the start winding 110 and protect the motor 102 from a fault or overcurrent condition.

Alternatively, or in addition, the control circuit 124 may determine at 432 whether a specified number of detection cycles have been reached with the detected voltage remaining below the low voltage threshold value. For example, if the control circuit performs three or more periodic voltage detections that are all below the low voltage threshold value at 424, the control circuit may determine at 436 that the switches should be opened to protect the motor from a possible fault or overcurrent condition.

In some embodiments, the assembly 100 may include one or more current sensors for detecting currents through the main winding 104 and/or the start winding 110. The control circuit 124 may compare the detected current(s) to an overcurrent threshold value. If the control circuit 124 determines that the detected current is greater than or equal to the overcurrent threshold value (e.g., to indicate that excess current is present in the main winding 104 and/or the start winding 110 and a temperature of the motor 102 may be exceeding a safe operating temperature), the control circuit 124 may open the switches 120 and 122 to disconnect the main winding 104 and start winding 110 from the power source 118 to protect the motor 102. In this manner, the same switches 120 and 122 may be used for both startup control and overcurrent protection of the motor 102.

In some embodiments, the detected current(s) may be considered as one or more overcurrent criteria for determining whether the motor 102 is experiencing an overcurrent condition (e.g., due to excess current in the windings), where other suitable criteria may include a speed of the motor, a temperature of the motor, etc.

Returning to FIGS. 2 and 3, an example layout for the main and start windings of the motor 102, and a rotor body 115 of the motor 102, are illustrated. For example, the motor 102 includes a rotor body 115 located concentrically within the opening 112 of the stator core 103. The rotor body 115 includes an external surface that faces the stator core 103.

The plurality of teeth 108 extend radially inward from the stator yoke 106. The plurality of teeth 108 define the boundaries of the winding slots 97 that are each located between adjacent teeth 108. Collectively, interior ends of the plurality of teeth 108 define the central opening 112 that receives the rotor body 115. Each slot 97 has a proximate end nearest the central opening 112, and a distal end radially distant from the central opening 112. Although the teeth 108 and the winding slots 97 are illustrated as being equally spaced circumferentially about the stator core 103, in other embodiments various other known teeth and slot configurations may be used.

As used herein, the terms about and substantially may mean manufacturing tolerances, within plus or minus one percent, within plus or minus five percent, etc. Example dimensions and values used herein are for purposes of illustration only, and other embodiments may have smaller or larger dimensions or values.

FIG. 3 illustrates an example winding pattern for the main winding 104 including opposing sections 104a and 104b, and the start winding 110 (which may be referred to as an auxiliary winding) including opposing sections 110a and 110b. The windings may be formed by looping conducting wire including aluminum about the teeth 108. For example, the conducing wire may include aluminum, copper, etc.

The main winding sections 104a and 104b form the two main poles of the motor 102. The main winding sections 104a and 104b are shown as solid lines in FIG. 3 to illustrate example locations of the sections. Each winding section 104a and 104b may include multiple coils, which are each wound through the slots 97 about the teeth 108.

The start winding sections 110a and 110b collectively form two starting poles for the motor 102. The start winding sections 110a and 110b are shown as solid lines in FIG. 3 to illustrate example locations of the sections. Each winding section 110a and 110b may include multiple coils, which are each wound through the slots 97 about the teeth 108.

Figure 7:
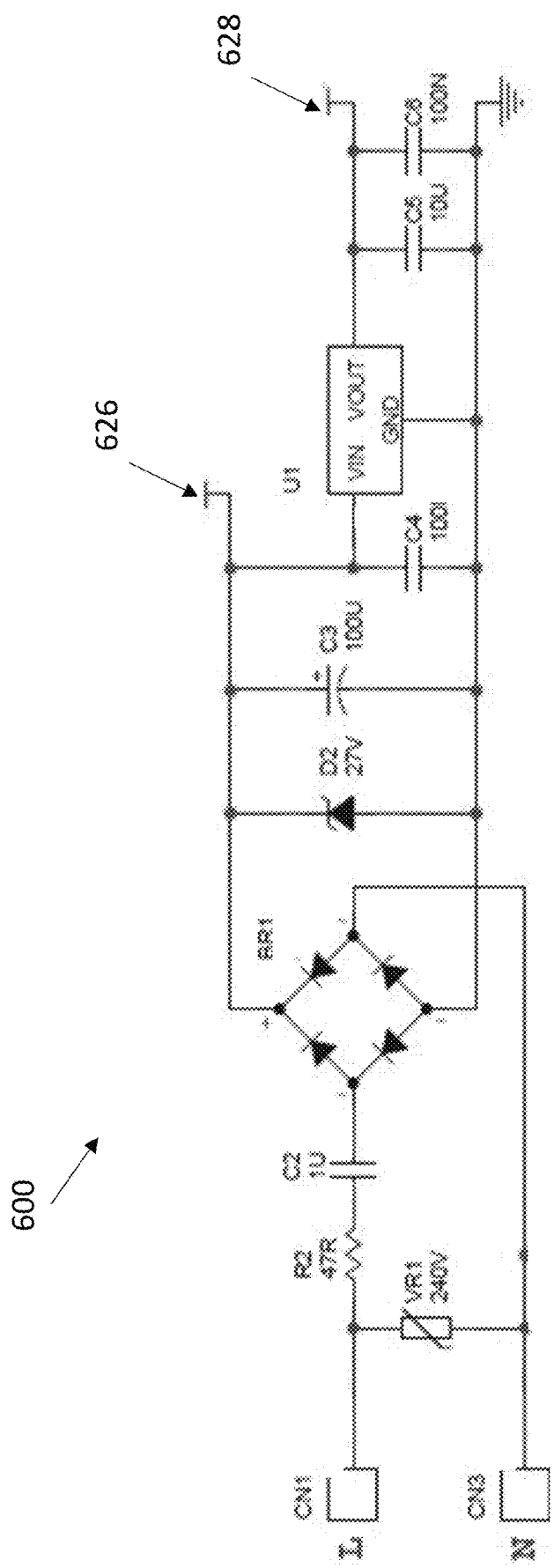
FIG. 7 is a circuit diagram of a power supply for supplying power to a microprocessor, according to another example embodiment of the present disclosure.

FIG. 7 is a circuit diagram showing details of an example power supply 600, which may be used in the assembly 100. For example, the power supply 600 may be part of the power source 118, may be coupled between the power source 118 and the line terminal 116, etc. In various implementations, any other suitable power supply circuits may be used, such as a small switching supply. The example power supply 600 may provide a low cost option for low current requirement implementations.

As shown in FIG. 7, the power supply 600 includes a terminal CN1 for connection to a line terminal of a power source, and a terminal CN2 for connection to a neutral terminal of a power source. A variable resistor VR1 is coupled between the terminals CN1 and CN2, which may include a metal oxide varistor (MOV) for transient protection. The power supply 600 includes a diode bridge BR1, which includes four diodes. A resistor R2 and a capacitor C2 are coupled in series between the terminal CN1 and the diode bridge BR1.

The diode bridge BR1 is coupled with a terminal 626, and the power supply 600 also includes a terminal 628. These terminals may be used to supply power to a microprocessor, a relay, etc. For example, the terminal 628 may be used to supply power to a microprocessor such as the control circuit 124 of FIG. 1, and the terminal 626 may have a higher voltage to supply power for relay control. A converter U1 may reduce a voltage from the diode bridge BR1 to a voltage that is suitable for a microprocessor.

For example, the diode bridge BR1 may supply a voltage of approximately 27V (e.g., as limited by a zener diode), and the converter U1 may reduce the voltage to 5V, 3.3V, etc. to power a microprocessor. The power supply 600 may include other suitable circuit components, such as the capacitors C4, C5 and C6 illustrated in FIG. 7.

Figure 8:
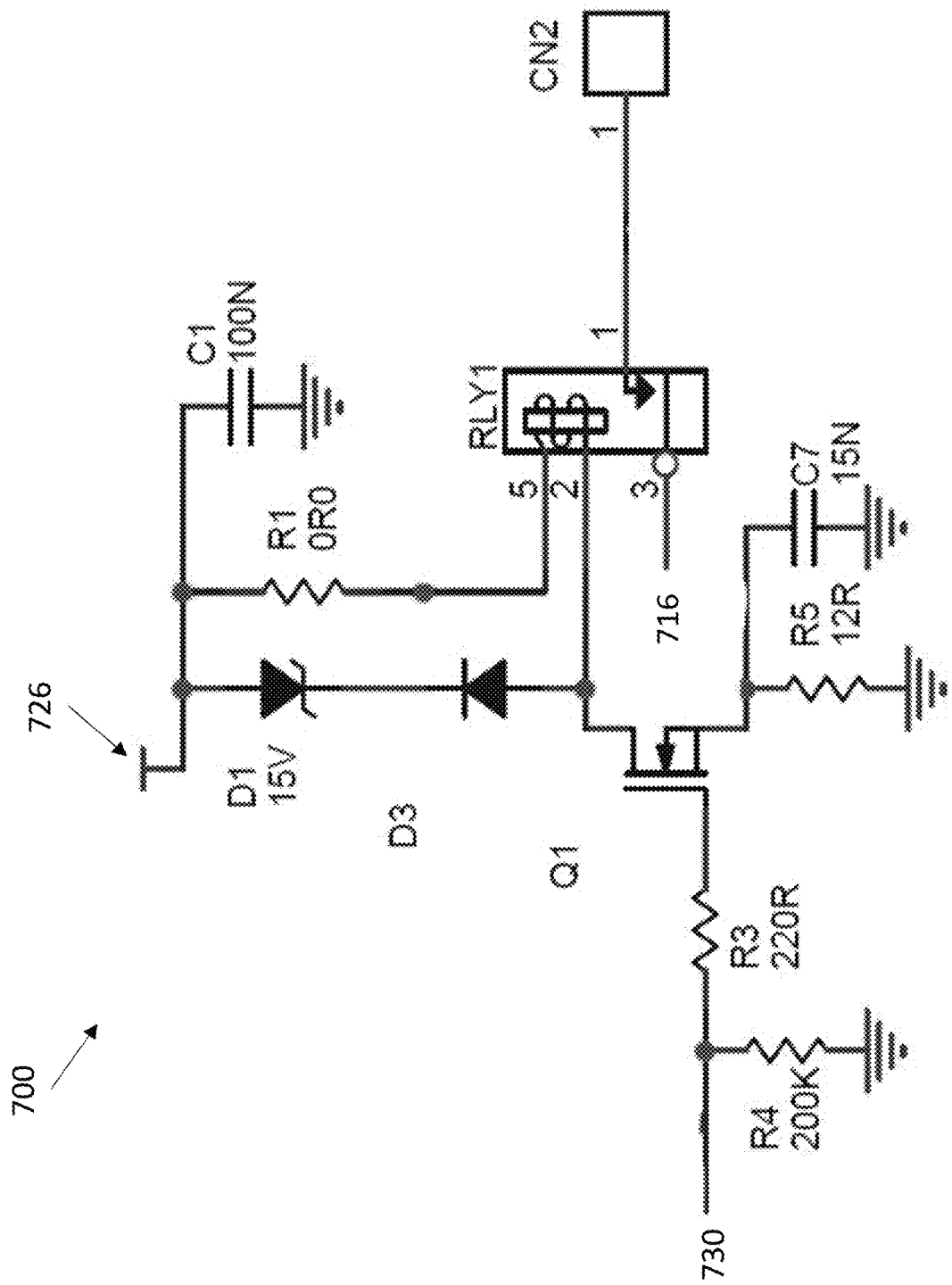
FIG. 8 is a wiring diagram for a relay coupled to selectively inhibit the supply of power to a winding of a disposer motor, based on signals from a microprocessor.

FIG. 8 is a circuit diagram illustrating example connections of an assembly 700 in including an electronic relay RLY1, which may be the similar to the switches 120 and 122 in FIG. 1. As shown in FIG. 8, the relay RLY1 receives a line voltage from a line terminal 716 (which may be similar to the line terminal 116 in FIG. 1).

The assembly 700 includes a switch Q1 that receives a control signal 730 from a control circuit, such as the control circuit 124 of FIG. 1. The switch Q1 selectively activates the relay RLY1, to selectively supply power from the line terminal 716 to a winding terminal CN2. For example, the winding terminal CN2 may be connected to the main winding 104 or the start winding 110 of FIG. 1.

The assembly 700 receives a voltage bias 726, which is connected with the relay RLY1 via the diodes D1 and D3, and the resistor R1. The assembly 700 also includes other optional components for implementation of the assembly, including resistors R2, R3 and R5, and capacitors C1 and C7. The example component values provided in FIGS. 7 and 8 are for purposes of illustration only, and other embodiments may use any other suitable component values. One assembly 700 may be used to implement the switch 120 of FIG. 1, while another assembly 700 is used to implement the switch 122.

The example component values illustrated in FIGS. 7 and 8 are for purposed of illustration only. The circuits of FIGS. 7 and 8 may provide relay current control for robustness and minimal power consumption. In various implementations, standard or other relay driving circuits may be used (which may or may not include current sensing).

As described herein, the example control circuits may include a microprocessor, microcontroller, integrated circuit, digital signal processor, etc., which may include memory. The control circuits may be configured to perform (e.g., operable to perform, etc.) any of the example processes described herein using any suitable hardware and/or software implementation. For example, the control circuits may execute computer-executable instructions stored in a memory, may include one or more logic gates, control circuitry, etc. In some embodiments, the control circuit 124 and/or the switches 120 and 122 may include an analog circuit implementation, a digital circuit implementation, a coordinated switching logic circuit, a low current switching device, etc.

In some embodiments, the switches 120 and/or 122 may be switched at less than maximum current (e.g., at approximately zero current). For example, the control circuit 124 may detect a voltage of the power source 118, the main winding 104 and/or the start winding 110, and then operate the switch 120 and/or 122 when the detected voltage is outside of a peak voltage range (such as a peak voltage value, a range of 50% to 100% of the peak voltage value, etc.).

Figure 9:
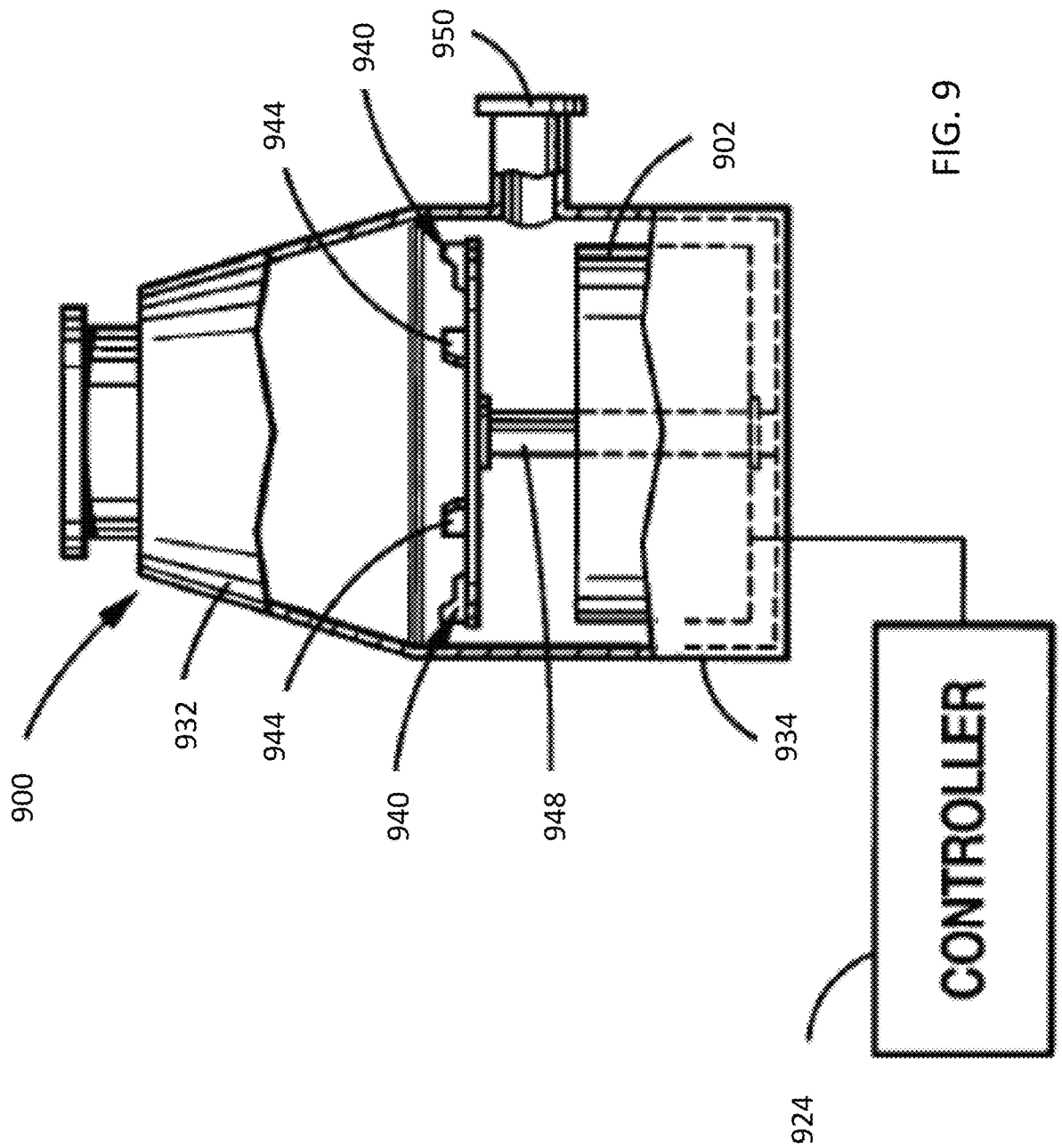
FIG. 9 is a partial sectional view of a food waste disposer according to another example embodiment of the present disclosure.

FIG. 9 illustrates a food waste disposer 900 according to another example embodiment of the present disclosure. The food waste disposer 900 includes a food conveying section 932 and a grinding mechanism 940, which is disposed between the food conveying section and a motor section 934. The food conveying section 932 includes an inlet for receiving food waste and water. The food waste is conveyed to the grinding mechanism 940, and the motor section 934 includes a motor 902 imparting rotational movement to a motor shaft 948 to operate the grinding mechanism 940. The motor 902 may be any suitable type of motor (including the motor 102 of FIG. 1), such as an induction motor, brushless permanent magnet motor (BLPM), DC motor, etc.

The grinding mechanism 940 includes a rotating shredder plate assembly that is rotated relative to a stationary grind ring by the motor shaft 948 to reduce food waste delivered by the food conveying section to small pieces. The shredder plate includes lugs 944 extending therefrom that force the food waste against the grind ring. When the food waste is reduced to particulate matter sufficiently small, it passes from above the shredder plate assembly, and along with water passing through the food conveying section, is then discharged from the disposer through a discharge outlet 950. A controller 924 is connected to the motor to control operation of the disposer 900. In FIG. 9, the controller 924 is shown external to the disposer housing for simplicity, though it could be situated inside the disposer housing. The controller 924 may include any suitable control circuit, such as the control circuit 124 of FIG. 1.

Figure 10:
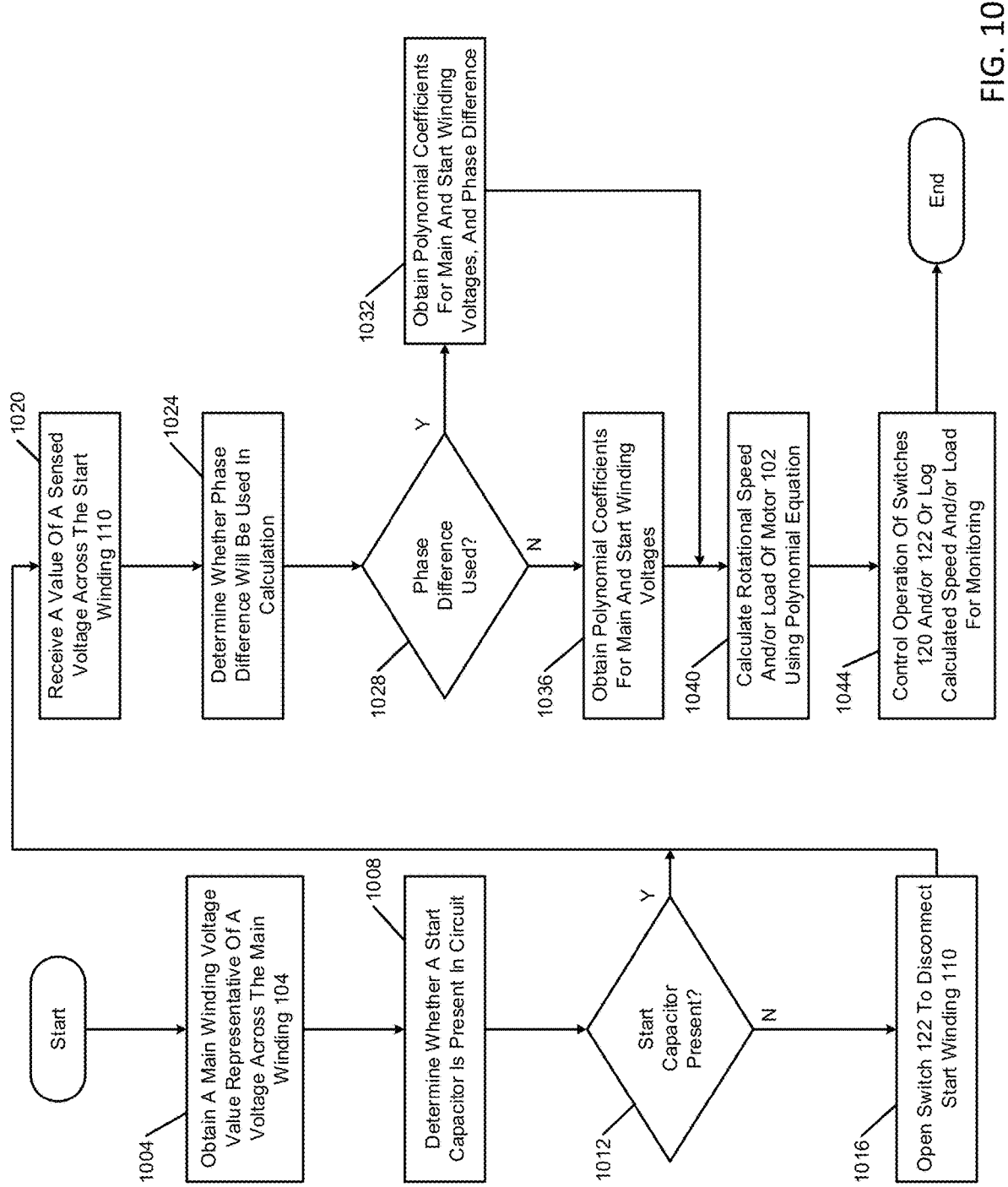
FIG. 10 is a flowchart depicting an example control process performed by the control circuit of FIG. 1, according to another example embodiment of the present disclosure.

FIG. 10 illustrates an example control process, which may be performed by the control circuit 124 to operate the switches 120 and/or 122. The process starts at 1004, by obtaining a main winding voltage value representative of a voltage across the main winding 104. At 1008, the control circuit determines whether a start (e.g., auxiliary) capacitor is present, such as the optional start capacitor 126 of FIG. 1. In various implementations, if the circuit is known to include the capacitor 126, the control circuit 124 may automatically proceed from 1004 to 1020 without an explicit determination of whether the capacitor is present (e.g., because software of the control circuit does not need to execute an if statement to check for the capacitor 126 if control circuit is already programmed according to knowledge that the capacitor 126 is present in the circuit).

If the start capacitor is not present at 1012, the control circuit 124 opens the switch 122 at 1016 to disconnect the start winding 110, prior to receiving a value of the sensed voltage across the start winding 110, at 1020. If the start capacitor is present at 1012, the control circuit 124 proceeds directly to 1020 to receive the value of the sensed voltage across the start winding 110.

At 1024, the control circuit 124 determines whether a phase difference will be used in the calculation of the motor rotational speed or load. If the phase difference will not be used at 1028, control obtains polynomial coefficients for main and start winding voltage values at 1036. If the phase difference will be used at 1028, the control circuit 124 obtains polynomial coefficients for main and start winding voltages, as well as the phase difference, at 1032. In various implementations, the explicit step of determining whether a phase difference will be used in the calculation at 1024 may not be programmed into software of the control circuit 124 if it is already known that a phase difference will be used.

The control circuit 124 then calculates a rotational speed and/or load of the motor 102 using the polynomial equation and the obtained coefficients, at 1040. At 1044, the control circuit 124 controls operation of the switch 120 and/or the switch 122 according to the calculated speed and/or load, or logs the calculated speed and/or load for monitoring. For example, the calculated speed or load (or any other suitable parameter derived from the main and auxiliary voltage readings) may be used for various purposes, such as storing a history of motor parameters, displaying motor parameters for monitoring, using motor parameters to control other components, etc. Therefore, the example method of FIG. 10 may be used in other suitable embodiments that do not include the switches 120 and 122, that include switch(es) in other locations of the motor that may or may not be controlled by the control circuit 124, that do not include switches at all, etc.

As described above, the control circuit 124 may measure a voltage across the main winding 104, measure a voltage across the start winding 110, and optionally calculate a phase difference between the voltages in order to account for capacitor changes, such as variations of the optional capacitor 126 in FIG. 1. The control circuit 124 may then use the measured and calculated values to predict a speed of the motor 102, a load of the motor 102, etc.

In various implementations, the voltage changes on the main winding 104 and/or the start winding 110 may be small, so various approaches may be used to measure the voltages more accurately. For example, AC tracking maybe used to measure waveforms of the voltages and determine a reference angle that can be used when calculating the phase difference between the voltages.

A filter may be used to take measurements, such as a digital filter of the control circuit 124 or a filter component coupled to the control circuit 124. This approach may be used when a slower response is acceptable, particularly if the phase difference is not required.

In various implementations, a potential divider may be used to obtain the voltages of the main winding 104 and the start winding 110. For example, a potential divider may be coupled between the control circuit 124 and the main winding 104 or start winding 110. In some embodiments, the main voltage may be a line voltage that is already being measured, so the example methods described herein may only add detection of the start winding 110.

In various implementations, main and start winding voltages may be sensed across different lines of the input power source. For example, if the line input includes a line L1 and a common line L2, the main voltage may be sensed across L1 and L2, and the start winding voltage may be sensed between a start winding and L2. This may be referred to as a main to common voltage and a start to common voltage.

An example polynomial for calculating the motor parameter(s) may be based on the voltage of the start winding 110 alone, the voltages of the start winding 110 and the main winding 104, the voltages of the start and main windings in combination with the phase difference between them, etc. For example, if a value of the capacitor 126 is known (or the capacitor 126 is not present in the assembly 100), the polynomial may use only the main and start winding voltages as inputs. If the line voltage is held to a high tolerance, the polynomial may use only the start winding voltage. An example polynomial is illustrated below.

$$\text{Speed} = p_0 + p_1 x + p_2 y + p_3 z + p_4 x^2 + p_5 xy + p_6 xz + p_7 y^2 + p_8 yz + p_9 z^2 + p_{10} x^3 + p_{11} x^2 y + p_{12} x^2 z + p_{13} xy^2 + p_{14} y^3 + p_{15} y^2 z + p_{16} xz^2 + p_{17} yz^2 + p_{18} z^3 + p_{19} xyz, \text{ where } x = \text{Main}$$

voltage, y=Start winding voltage, z=Phase between main & aux voltages, and $p_0$-$p_{19}$ are coefficients                                              Equation 1.

In various implementations, the coefficients may be specified according to any suitable techniques, such as collecting data through initial testing of induction motors and subsequent fitting of the coefficients, etc. The equation above is an example only, and other embodiments may use other equation forms. For example, if only a rough speed prediction is needed to determine if the motor is stalling, a lower accuracy equation may be used.

Some embodiments may use multiple sets of coefficients, or multiple equation forms, to provide better fits or simpler equations. For example, one set of coefficients may be used when the motor 102 is operating in a first motor operation range (such as near full speed), while a second set of coefficients is used when the motor 102 is operating in a second motor operation range (such as near a breakdown torque).

As another example, a first set of coefficients may be used to determine a speed of the motor 102, a second set of coefficients may be used to determine a load of the motor 102, a third set of coefficients may be used to determine a capacitor value of the capacitor 126, and a fourth set of coefficients may be used to determine a current of the motor 102. In various implementations, calculations may be reduced by reusing variable terms multiple times. In some implementations, other parameters may be derived from the speed, load, etc., such as deriving a current from the speed or load, and deriving a power of the motor 102 based on the speed and load.

In various implementations, the speed or load of the motor may be determined via the main and auxiliary winding voltage via other suitable algorithms. For example, a look up table may store speed, load, or other suitable motor parameters according to main and auxiliary winding voltages, and the control circuit 124 may use the look up table to predict the motor speed, load, etc. based on sensed main and auxiliary winding voltages.

Figure 11A:
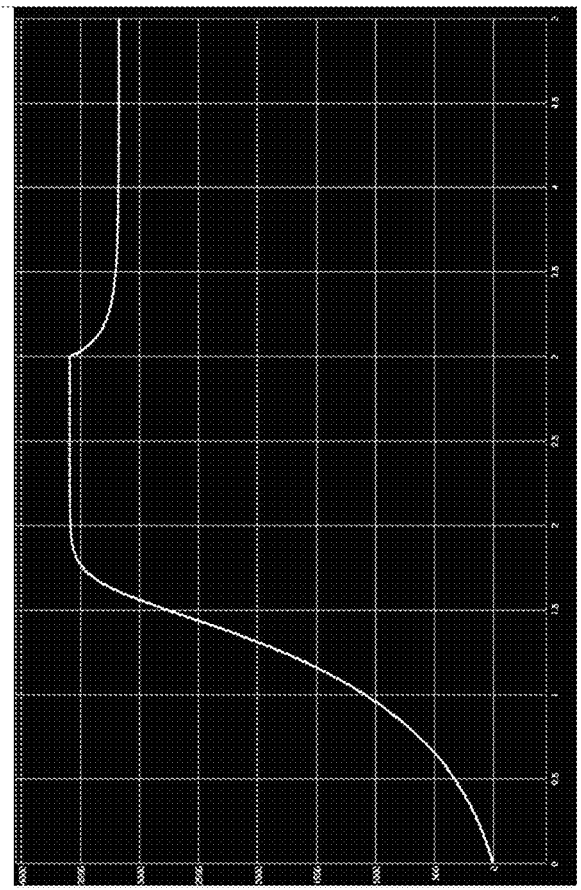
FIG. 11A is a waveform illustrating an example simulated speed of the motor of FIG. 1.

FIG. 11A illustrates an example simulated speed 1100 of the motor 102, as measured using a filter (such as a digital filter of the control circuit 124 or a filter component coupled with an input of the control circuit 124). FIG. 11A illustrates starting of the motor 102 followed by a step load. Therefore, the motor speed ramps up initially to a higher steady state speed value during startup, then drops off to a lower steady state speed after the load increases.

Figure 11B:
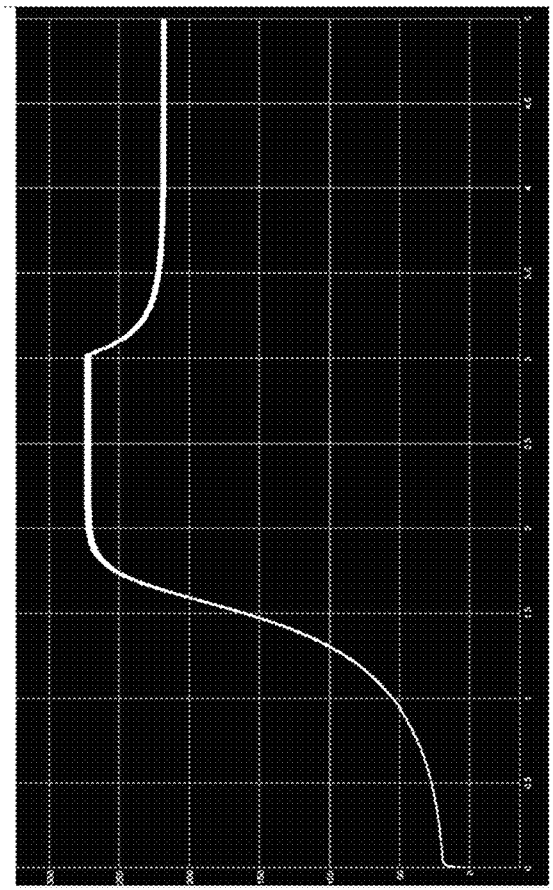
FIG. 11B is a waveform illustrating an example simulated voltage across the auxiliary winding of FIG. 1.

FIG. 11B illustrates an example simulated voltage 1102 of the start winding 110, as measured using a filter. As shown in FIG. 11B, the voltage on the start winding 110 increases initially to a higher steady state value during startup of the motor 102, then drops off to a lower steady state value after a step load is applied. The voltage waveform 1102 corresponds to the simulated speed 1100 of FIG. 11A, indicating that in this example the voltage on the start winding 110 may be used to predict the speed of the motor 102.

Figure 12:
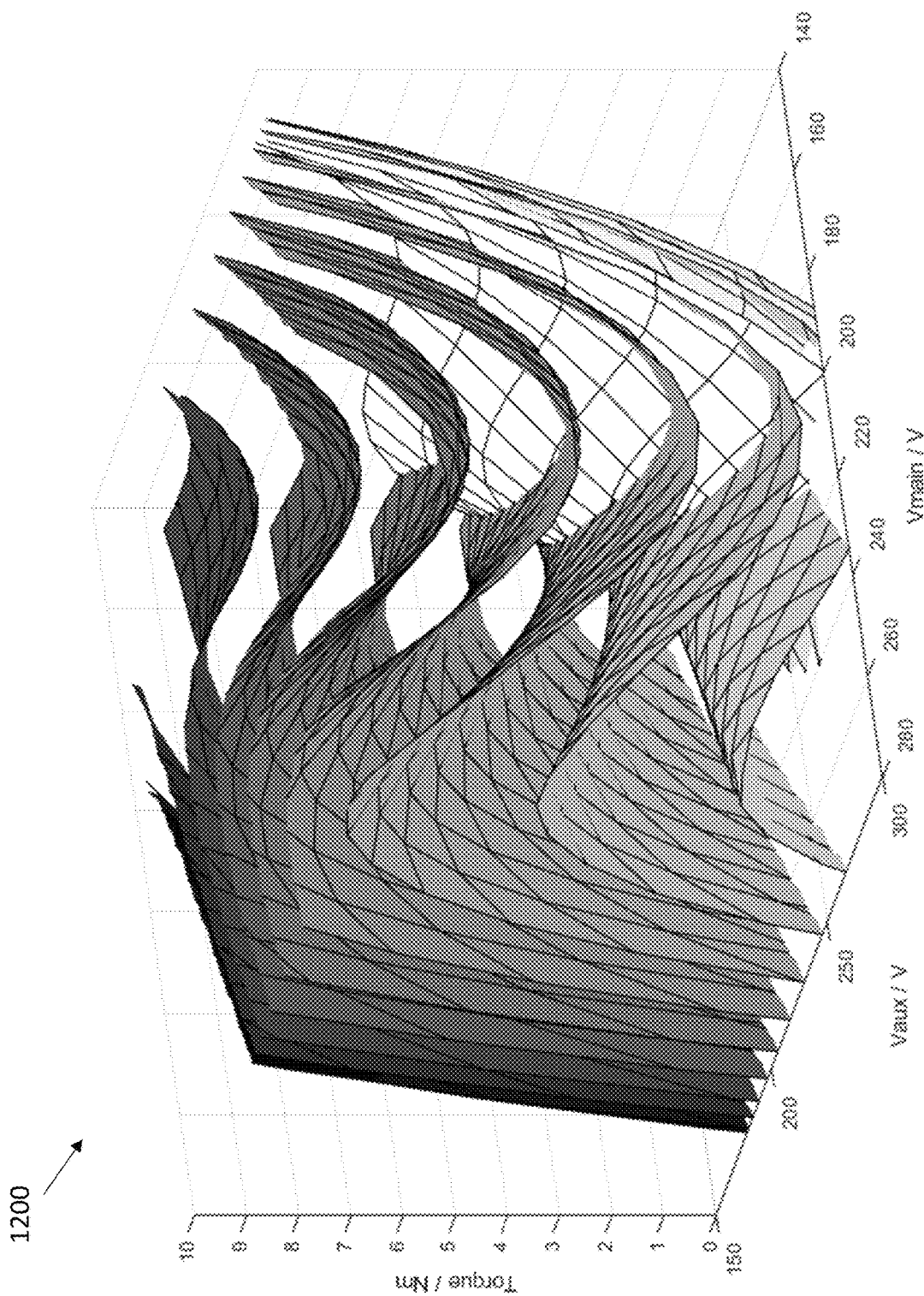
FIG. 12 is a graph illustrating example curve fitting surfaces for polynomial coefficients used for motor parameter prediction.

FIG. 12 is a graph 1200 illustrating example curve fitting surfaces for polynomial coefficients used for motor parameter prediction. For example, FIG. 12 illustrates a representation of a four dimensional surface, using multiple three dimensional surfaces. Each surface represents a different step of phase angles between the main and auxiliary winding voltages (such as 2.5 degree steps from about seventy degrees up to about one hundred degrees).

The coefficients of a corresponding polynomial are determined by fitting data points measured from motor operations values. For example, a curve fitting algorithm may be used on a set of measured motor data points at various speeds, torques, phase angles, main and start winding voltages, etc., to generate the multiple surfaces (such as by using a least squares surface fit, pseudo inverse matrix or array). Then, if main and start winding voltages are measured from a motor, and a phase angle is determined, the surfaces of the graph 1200 may be used to predict a current torque of the motor (or a current speed or other desired prediction parameter that has been modeled).

In various implementations, polynomial coefficients may be tuned to increase desired motor control performance. For example, the coefficients may be weighted in areas within the parameter space that are more important to motor operation (such as areas where the motor spends most of its time operating), or more measurements may be taken from a sample motor in the more important operation parameter areas to give better prediction accuracy for improved control. Less adjustment or precision may be needed at areas where the motor does not normally operate. For example, it may be difficult to take accurate measurements when a motor is close to stalling out, so smaller weights may be used for such areas in the parameter space.

As mentioned above, in various implementations multiple polynomial equations may be used for different situations, which have different coefficients. For example, two different sets of polynomial equations could be used for different capacitor values coupled with a start winding or main winding (such as a first set of coefficients for capacitors in a range of 25 to 45 microfarads and another set of coefficients for capacitors in a range of 125 to 185 microfarads).

According to another embodiment of the present disclosure, a method of controlling an induction motor assembly is disclosed. The assembly includes an induction motor having a stator core that includes a stator yoke and a plurality of teeth extending from the stator yoke toward a central opening, with the central opening extending from a first end of the stator core to a second end of the stator core opposite the first end, and the plurality of teeth spaced apart from one another and defining a plurality of slots between the plurality of teeth. The motor further includes a main winding and an auxiliary winding located within the plurality of slots and wrapped around the plurality of teeth, a first switch coupled between the line terminal and the main winding, and a second switch coupled between the line terminal and the auxiliary winding.

The method includes obtaining a main winding voltage value representative of a voltage across the main winding, receiving an auxiliary winding voltage value according to a sensed voltage across the auxiliary winding, and determining at least one of a rotational speed of the induction motor and a load of the induction motor, according to the main winding voltage value and the auxiliary winding voltage value. The method incudes controlling switching operation of at least one of the first switch and the second switch according to the determined rotational speed or the determined load.

In various implementations, the method includes calculating a phase difference between the voltage across the main winding and the voltage across the auxiliary winding. For example, calculating the phase difference may include tracking a waveform of the voltage across the main winding to generate a main phase angle, tracking another waveform of the voltage across the auxiliary winding to generate an auxiliary phase angle, and determining the phase differences according to the main phase angle and the auxiliary phase angle. Example techniques for determining phase differences by tracking voltage waveforms and generating phase angles are discussed in U.S. Pat. Nos. 8,264,860 and 10,305,537. The entire disclosures of these references are incorporated herein by reference.

Determining may include determining the rotational speed or the load according to the calculated phase difference, the main winding voltage value and the auxiliary winding voltage value. In various implementations, the method may include opening the second switch prior to receiving the auxiliary winding voltage value according to the sensed voltage across the auxiliary winding.

Determining may include determining the rotational speed or the load according to a polynomial equation having specified coefficients, without using a look up table, wherein the main winding voltage value and the auxiliary winding voltage value comprise inputs to the polynomial equation. The method may include calculating a phase difference between the voltage across the main winding and the voltage across the auxiliary winding, wherein the phase difference comprises one or more inputs to the polynomial equation.

In various implementations, the method may include determining at least one of a power of the induction motor and a current of the induction motor, according to the determined rotational speed and load of the induction motor, wherein controlling includes controlling the switching operation of the first switch or the second switch according to the determined power or the determined current of the induction motor. The assembly may include a capacitor coupled between the line terminal and the second switch, where the method further includes determining a degradation value of the capacitor according to the calculated phase difference and at least one of the main winding voltage and the auxiliary winding voltage.

According to another embodiment of the present disclosure, a method of controlling a disposal assembly is disclosed. The assembly includes a motor coupled to operate a grinding mechanism of a food waste disposer. The motor includes a stator core having a stator yoke and a plurality of teeth extending from the stator yoke toward a central opening, with the central opening extending from a first end of the stator core to a second end of the stator core opposite the first end, and the plurality of teeth spaced apart from one another and defining a plurality of slots between the plurality of teeth. The motor further includes a main winding and a start winding located within the plurality of slots and wrapped around the plurality of teeth, a first switch coupled between the line terminal and the main winding, and a second switch coupled between the line terminal and the start winding. The method includes closing the first switch and opening the second switch to supply power from the power source to the main winding, detecting a voltage of at least one of the main winding and the start winding, and closing the second switch in response to detection of the voltage below a low voltage threshold value indicative of an excess load condition of the motor, to supply power from the power source to the main winding and the start winding. Subsequent to closing the second switch, the method includes periodically detecting the voltage of the at least one of the main winding and the start winding, and in response to the detected voltage remaining below the low voltage threshold value for a specified number of periods, opening the first switch and the second switch to inhibit the supply of power from the power source to the main winding and the start winding.

Detecting the voltage may include detecting the voltage of the at least one of the main winding and the start winding according to a back electromagnetic force (EMF) of the at least one of the main winding and the start winding. The method may include opening the second switch prior to detecting the voltage of the start winding.

In some embodiments, the control circuit may include a digital microprocessor, the first and second switches may include electronic relays, and the motor may include a single phase induction motor. The method may include closing the first switch and the second switch during a specified initial startup time period of the motor, and opening the second switch at the end of the specified initial startup time period.

The assembly may include a capacitor coupled between the line terminal and the second switch. The method may include closing the first switch and the second switch during an initial startup time period of the motor, and opening the second switch in response to detection of the voltage above a start voltage threshold value indicative of a successful startup of the motor.

Example embodiments described herein may provide one or more advantages, including but not limited to, providing an integrated dual purpose electronic switch that reduces a physical footprint on a circuit board (e.g., as compared to disposers that use mechanical switches and separate overcurrent protection circuits), reducing manufacturing complexity by using a single switching component, increasing motor control options, and providing the ability to add additional features to the assembly, such as wireless control, light emitting diode (LED) lighting, and other smart features that may be controlled by the microprocessor.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A disposal assembly comprising:
   a motor coupled to operate a grinding mechanism of a food waste disposer, the motor including a stator core having a stator yoke and a plurality of teeth extending from the stator yoke toward a central opening, the central opening extending from a first end of the stator core to a second end of the stator core opposite the first end, the plurality of teeth spaced apart from one another and defining a plurality of slots between the plurality of teeth, the motor further including a main winding and a start winding located within the plurality of slots and wrapped around the plurality of teeth, the main winding coupled with a line terminal to receive power from a power source, and the start winding coupled with the line terminal to receive power from the power source;
   a first switch coupled between the line terminal and the main winding to selectively inhibit the supply of power from the power source to the main winding;
   a second switch coupled between the line terminal and the start winding to selectively inhibit the supply of power from the power source to the start winding;
   a capacitor coupled between the line terminal and the second switch; and
   a control circuit coupled to control switching operation of the first switch and the second switch, the control circuit configured to:
   close the first switch and the second switch during an initial startup time period of the motor;

detect a voltage of at least one of the main winding and the start winding;

open the second switch in response to detection of the voltage above a start voltage threshold value indicative of a successful startup of the motor; and subsequent to opening the second switch, close the second switch in response to detection of the voltage below a low voltage threshold value indicative of an excess load condition of the motor, wherein the control circuit is configured to determine at least one of a rotation speed value of the motor and a load of the motor according to a polynomial equation having specified coefficients, and the voltage of the main winding and the voltage of the start winding comprise inputs to the polynomial equation.

2. The assembly of claim 1, wherein the control circuit is configured to, subsequent to closing the second switch in response to detection of the voltage below the low voltage threshold value, open the second switch in response to detection of the voltage above the low voltage threshold value.

3. The assembly of claim 2, wherein the control circuit is configured to determine the rotation speed value of the motor according to the detected voltage.

4. The assembly of claim 3, wherein the start voltage threshold value corresponds to a determined rotation speed value of at least 1500 revolutions per minute (RPM).

5. The assembly of claim 3, wherein the low voltage threshold value corresponds to a determined rotation speed value of less than or equal to 500 revolutions per minute (RPM).

6. The assembly of claim 1, wherein the control circuit is configured to detect the voltage of the at least one of the main winding and the start winding according to a back electromagnetic force (EMF) of the at least one of the main winding and the start winding.

7. The assembly of claim 1, wherein the control circuit comprises a digital microprocessor and the first switch and the second switch each comprise an electronic relay.

8. The assembly of claim 7, wherein the microprocessor, the first switch and the second switch comprise an integrated electronic switch, and the assembly does not include any mechanical centrifugal switches or thermal overload switches.

9. The assembly of claim 7, wherein the microprocessor is configured to receive a wireless control signal via a wireless communication interface, and adjust switching operation of at least one of the first switch and the second switch according to the wireless control signal.

10. The assembly of claim 7, further comprising a light emitting diode (LED), wherein the microprocessor is configured to control the LED according to at least one status condition of the motor.

11. The assembly of claim 1, wherein the control circuit is configured to calculate a phase difference between the voltage of the main winding and the voltage of the start winding by:

tracking a waveform of the voltage of the main winding to generate a main winding phase angle;

tracking another waveform of the voltage of the start winding to generate a start winding phase angle; and determining the phase difference according to the main winding phase angle and the start winding phase angle.

12. The assembly of claim 11, wherein the control circuit is configured to determine at least one of the rotational speed value of the motor and the load of the motor according to the calculated phase difference, the voltage of the main winding and the voltage of the start winding.

13. The assembly of claim 1, wherein:

the control circuit is configured to calculate a phase difference between the voltage of the main winding and the voltage of the start winding;

the phase difference comprises one or more inputs to the polynomial equation;

the polynomial equation has a form of rotational speed or load$=p_0+p_1x+p_2y+p_3z+p_4x^2+p_5xy+p_6xz+p_7y^2+p_8yz+p_9z^2+p_{10}x^3+p_{11}x^2y+p_{12}x^2z+p_{13}xy^2+p_{14}y^3+p_{15}y^2z+p_{16}xz^2+p_{17}yz^2+p_{18}z^3+p_{19}xyz$;

x is the voltage of the main winding;

y is the voltage of the start winding;

z is the phase difference; and $p_0$-$p_{19}$ are the specified coefficients.

14. The assembly of claim 1, wherein the motor comprises a single phase induction motor.

* * * * *